US00RE43734E

(19) United States
(12) Reissued Patent
Sasaki

(10) Patent Number: US RE43,734 E
(45) Date of Reissued Patent: Oct. 16, 2012

(54) V-TYPE ENGINE AIR INTAKE DEVICE

(75) Inventor: Junya Sasaki, Yokohama (JP)

(73) Assignee: Nissan Motor Co., Ltd., Yokohama (JP)

(21) Appl. No.: 13/226,011

(22) Filed: Sep. 6, 2011

Related U.S. Patent Documents

Reissue of:
(64) Patent No.: 7,428,888
Issued: Sep. 30, 2008
Appl. No.: 11/752,372
Filed: May 23, 2007

(30) Foreign Application Priority Data

May 24, 2006 (JP) ..... 2006-144298

(51) Int. Cl.
*F02M 35/00* (2006.01)

(52) U.S. Cl. ..... 123/184.34; 123/184.47

(58) Field of Classification Search ..... 123/54.4–54.8, 123/184.31–184.37, 184.47–184.51
See application file for complete search history.

(56) References Cited

U.S. PATENT DOCUMENTS

| | | | |
|---|---|---|---|
| 3,783,845 | A | 1/1974 | Brandstetter |
| 5,657,727 | A | 8/1997 | Uchida |
| 6,202,627 | B1 | 3/2001 | Akima |

FOREIGN PATENT DOCUMENTS

| | | | |
|---|---|---|---|
| EP | 0 722 042 | A2 | 7/1996 |
| EP | 1 445 468 | A1 | 8/2004 |
| JP | 2000-054845 | | 2/2000 |
| JP | 2000-54845 | | 2/2000 |

OTHER PUBLICATIONS

The extended European Search Report of the corresponding European Patent Application No. 07108704.3-1263, dated Dec. 18, 2010.

*Primary Examiner* — Noah Kamen
(74) *Attorney, Agent, or Firm* — Gloabl IP Counselors, LLP

(57) ABSTRACT

A V-type engine air intake device is provided for a V-type internal combustion engine. The V-type engine air intake device has a volume chamber, a first intake pipe, a second intake pipe and a plurality of curved branch pipes. The first intake pipe has a first outlet end connected to a first intake opening of the volume chamber. The second intake pipe has a second outlet end connected to a second intake opening of the volume chamber. The first and second outlet ends are arranged with first and second center outlet axes where that the first and second intake pipes connect to the volume chamber. The second center outlet axis is non-coincident with the first center outlet axis. The branch pipes each has an inlet end that opens inside the volume chamber in a substantially vertical downward direction.

17 Claims, 8 Drawing Sheets

V-TYPE ENGINE AIR INTAKE DEVICE

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority to Japanese Patent Application No. 2006-144298, filed on May 24, 2006. The entire disclosure of Japanese Patent Application No. 2006-144298 is hereby incorporated herein by reference.

BACKGROUND OF THE INVENTION

1. Field of the Invention

The present invention relates to an intake device for an internal combustion engine. More particularly, the present invention relates to an intake device for a V-type internal combustion engine equipped with two intake devices for a plurality of cylinder banks.

2. Background Information

One typical type of intake device for a V-type internal combustion engine has two air induction passage arrangements, i.e., a left air induction arrangement and a right air induction arrangement, serving to deliver intake air from a pair of left and right throttle bodies (e.g., Japanese Laid-Open Patent Publication No. 2000-54845).

In view of the above, it will be apparent to those skilled in the art from this disclosure that there exists a need for an improved intake device. This invention addresses this need in the art as well as other needs, which will become apparent to those skilled in the art from this disclosure.

SUMMARY OF THE INVENTION

In the intake manifold (intake device) disclosed in the above mentioned publication, communication passages extending from the left and right are arranged facing opposite each other with a resonance switching valve in-between. When the resonance switching valve is opened during low engine speeds, the intake air supplied from the throttle bodies through the left and right air induction arrangements collide (interfere) with each other in the communication passages. As a result, the intake resistance increases, and the engine output is prevented from increasing.

The object of the present invention is to reduce the resistance to the flow of intake air from the throttle bodies to the intake ports in an intake device of a V-type internal combustion engine. This resistance to the flow of intake air from the throttle bodies to the intake ports will hereinafter be referred to as "intake resistance".

To attain the above mentioned object of the present invention, a V-type engine air intake device is basically provided with a volume chamber, a first intake pipe, a second intake pipe and a plurality of curved branch pipes. The volume chamber is arranged between a first side cylinder bank and a second side cylinder bank. The volume chamber has a first intake opening located adjacent the first side cylinder bank and a second intake opening located adjacent the second side cylinder bank. The first intake pipe has a first outlet end connected to the first intake opening of the volume chamber and a first inlet end arranged to supply intake air drawn into the first intake pipe to the volume chamber. The first outlet end is arranged with a first center outlet axis where that the first intake pipe connects to the first intake opening of the volume chamber. The second intake pipe has a second outlet end connected to the second intake opening of the volume chamber and a second inlet end arranged to supply intake air drawn into the second intake pipe to the volume chamber. The second outlet end is arranged with a second center outlet axis where that the second intake pipe connects to the second intake opening of the volume chamber, with the second center outlet axis being non-coincident with the first center outlet axis. The curved branch pipes each has an inlet end that opens inside the volume chamber in a substantially vertical downward direction and an outlet end opening for supplying intake air to a corresponding cylinder of the first and second cylinder banks.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
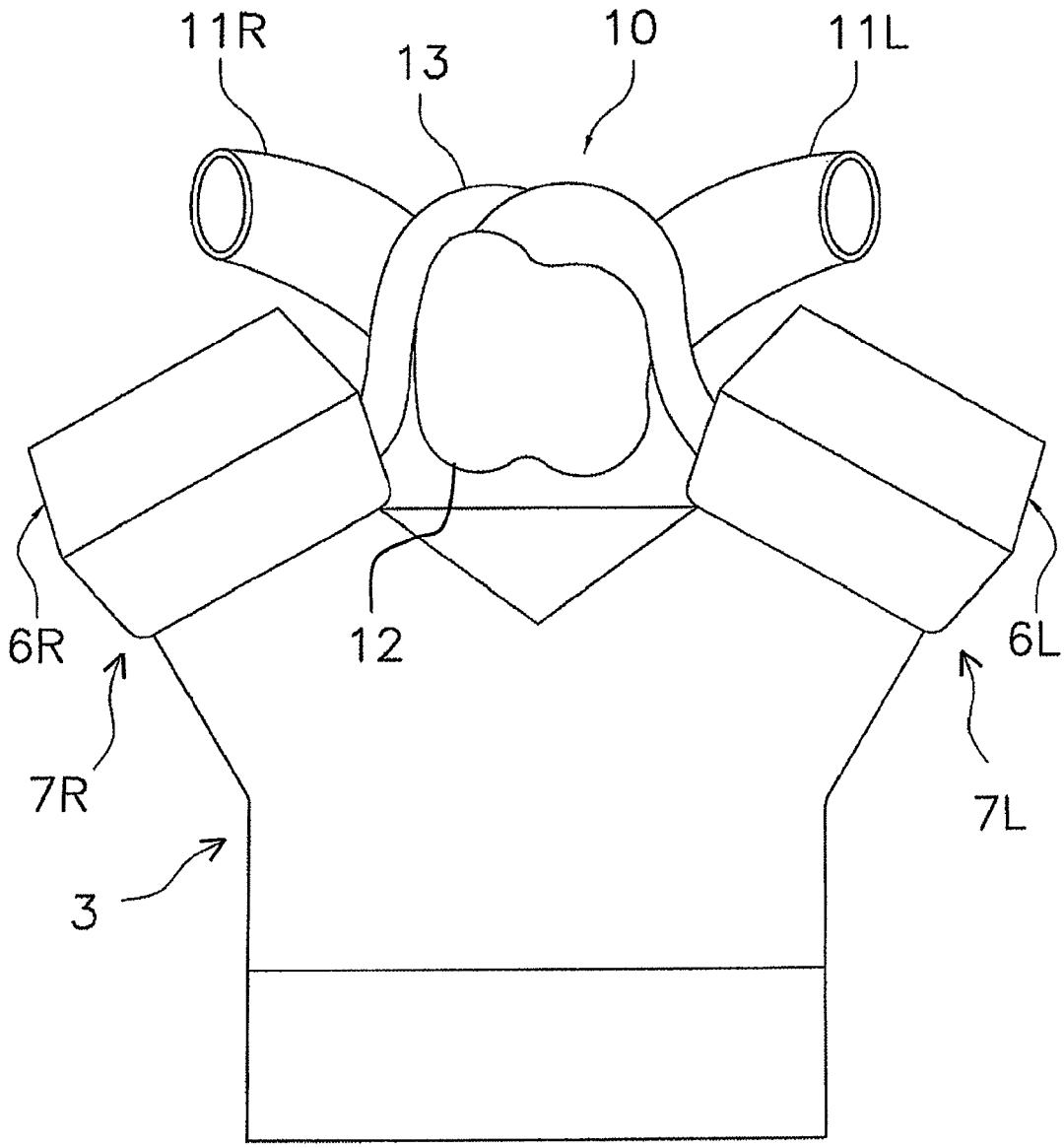
FIG. 1 is a simplified front elevational view of a V-type internal combustion engine having an air intake device in accordance with a first embodiment of the present invention.

Referring initially to FIG. 1, a simplified front elevational view of a V-type internal combustion engine is illustrated that has a cylinder block 3 with an intake device 10 in accordance with an embodiment of the present invention. In the illustrated embodiments, the V-type internal combustion engine can be a gasoline engine or a diesel engine. Additionally, in the illustrated embodiments, it is assumed that the movement direction of the vehicle is the forward (forward) direction and such other direction terms as left, right, forward, rearward, lateral, and longitudinal are defined based on this assumption.

As an example, in this illustrated embodiment the V-type internal combustion engine is a V-8 engine having a left cylinder bank 6L with four cylinders and a right cylinder bank 6R with four cylinders. As shown in FIG. 1, in this V-8 engine, the four cylinders are arranged in a row in each of the left and right cylinder banks 6L and 6R. The left cylinder bank 6L includes a left cylinder head 7L. The right cylinder bank 6R includes a right cylinder bank 7R. The left and right cylinder heads 7L and 7R are arranged on top of the cylinder block 3.

Figure 2:
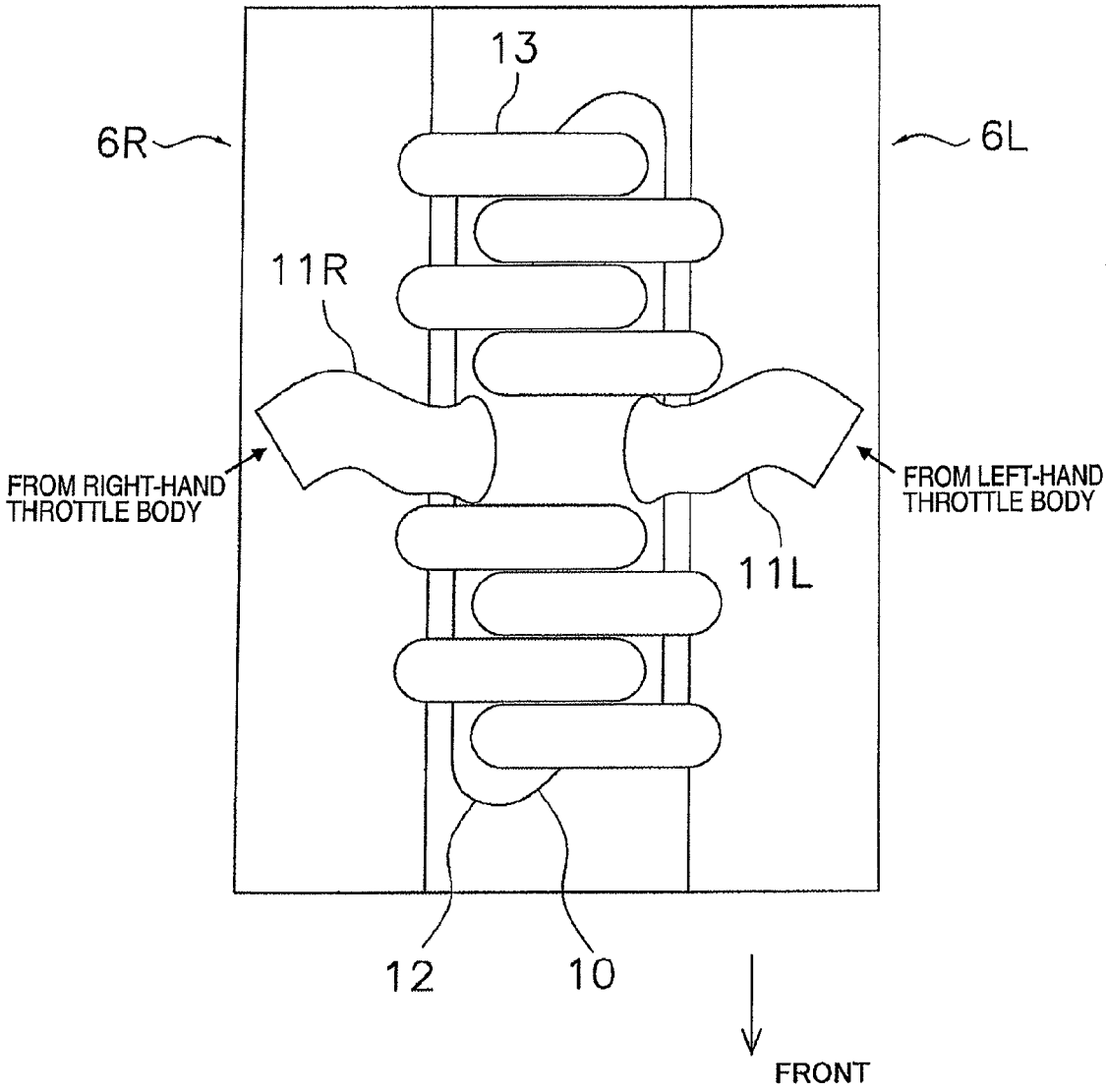
FIG. 2 is a simplified top plan view of the V-type internal combustion engine with the air intake device illustrated in FIG. 1 in accordance with the first embodiment.
Figure 3:
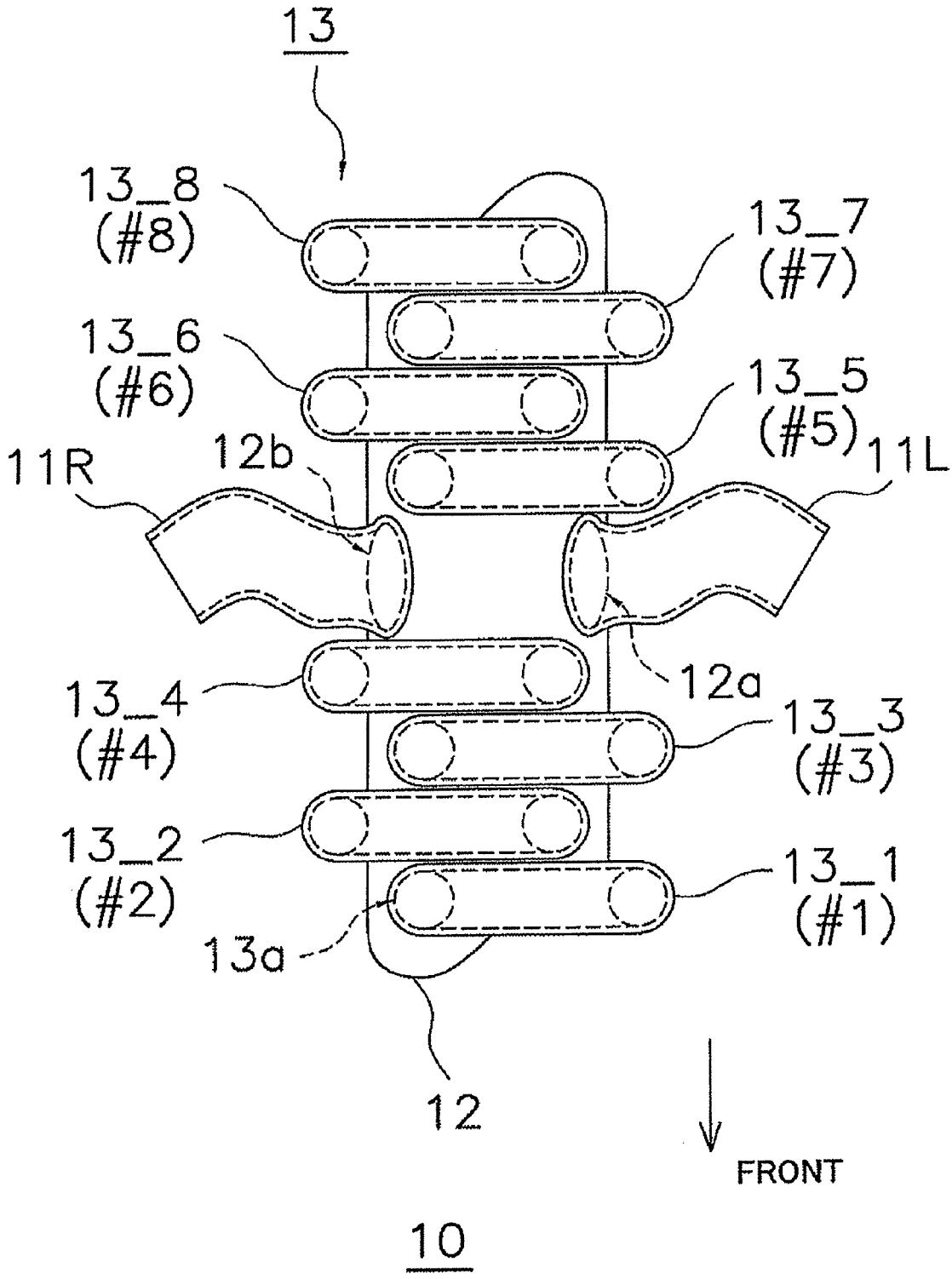
FIG. 3 is a simplified top plan view of the air intake device in accordance with the first embodiment illustrated in FIGS. 1 and 2.

As shown in FIGS. 1 to 3, the air intake device 10 includes a left intake pipe 11L, a right intake pipe 11R, a surge tank 12 (volume chamber) and an intake manifold 13. As shown in FIGS. 1 and 2, the surge tank 12 is arranged substantially in the middle between the left cylinder bank 6L and the right cylinder bank 6R. Intake air flowing from a left-hand throttle body and a right-hand throttle body located upstream passes through the left intake pipe 11L and the right intake pipe 11R, respectively. The intake air is then directed into the surge tank 12 from the left and right. The intake air directed into the surge tank 12 passes through the intake manifold 13, and is distributed to the individual cylinders of the left and right cylinder banks. With the present invention, since the flows of intake air flowing into the surge tank 12 from the left intake pipe 11L and the right intake pipe 11R do not interfere with one another, it is possible to reduce the intake resistance with respect to intake air supplied to the cylinders of a V-type internal combustion engine.

Figure 4:
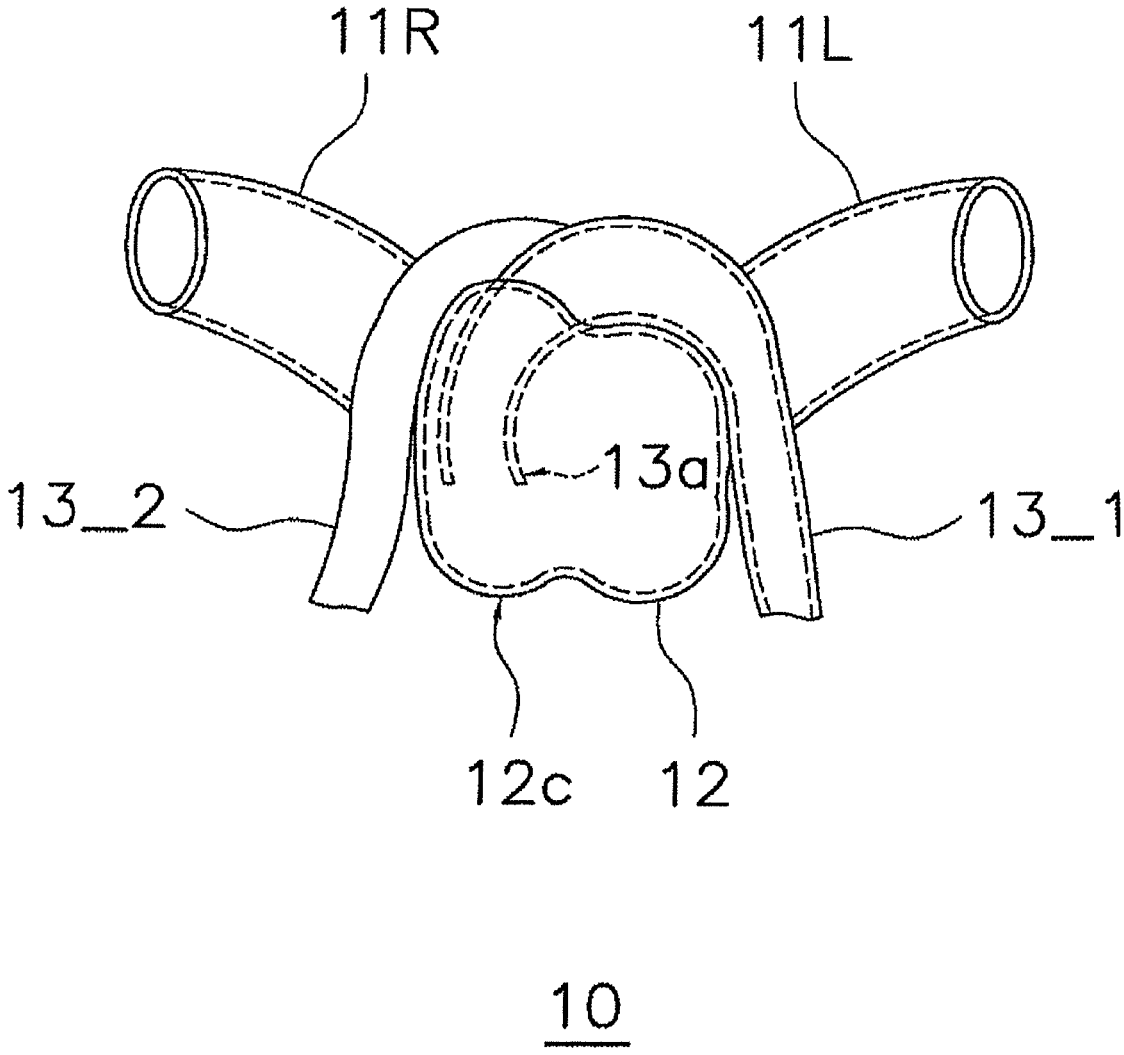
FIG. 4 is a simplified front elevational view of the air intake device in accordance with the first embodiment illustrated in FIGS. 1 to 3.

FIG. 3 is a simplified top plan view of the air intake device 10. FIG. 4 is a simplified front elevational view of the air intake device 10. In FIG. 3, the downward direction in the plane of the paper corresponds to the direction (direction in which the vehicle travels) or the front of the vehicle. As shown in FIG. 3, the left intake pipe 11L and the right intake pipe 11R extend from throttle bodies positioned upstream. The surge tank 12 (volume chamber) has a prescribed volume. The intake manifold 13 includes a plurality of branch pipes 13_1 to 13_8 arranged to supply intake air to the intake ports of each of the cylinders. One end of the left intake pipe 11L is connected to the left throttle body (not shown in FIG. 3) and the other end is connected to a left-hand opening 12a of the surge tank 12. Similarly, one end of the right intake pipe 11R is connected to the right throttle body and the other end is connected to a right-hand opening 12b of the surge tank 12. Thus, the left and right intake pipes 11L and 11R constitute intake passages leading from the left and right throttle bodies to the surge tank 12.

As shown in FIG. 3, the surge tank 12 is a volume chamber that is elongated in the longitudinal direction of the vehicle and positioned in a substantially middle position between the left and right cylinder banks 7L and 7R. The surge tank 12 has a left opening 12a provided in a left side face at a position substantially in the middle of the surge tank 12 in the longitudinal direction and a right opening 12b provided in a right side face at a position substantially in the middle of the surge tank 12 in the longitudinal direction. The surge tank 12 serves as an intake air collector that collects intake air that passes through the left and right openings 12a and 12b from the left and right intake pipes 11L and 11R, respectively. The left and right openings 12a and 12b are provided in the approximate middle along the lengthwise direction of the volume chamber in a top plan view in order to distribute the intake air efficiently and evenly to the branch pipes 13_1 to 13_8 located downstream.

As shown in FIG. 4, the surge tank 12 has a bottom inside surface 12c that is formed with a left recessed section and a right recessed section. The recessed sections serve to cause the intake air from the left and right intake pipes 11L and 11R to be fed into the intake manifold 13 (branch pipes 13_1 to 13_8) in an efficient manner. The branch pipes 13_1 to 13_8 of the intake manifold 13 serve to transfer the air inside the surge tank 12 to the surge tank 12 to the corresponding cylinders. Each of the branch pipes 13_1 to 13_8 corresponds to one of the first (#1) to eighth (#8) cylinders, respectively. FIG. 3 shows cylinder numbers indicating which cylinder each of the branch pipes corresponds to.

The structural features of the branch pipes will now be explained with reference to FIG. 4. Taking the branch pipe 13_1, for example, one end 13a of the pipe is located inside the surge tank 12 and opens downwardly on the opposite side of the surge tank 12 from the side on which the corresponding cylinder is located (i.e., the pipe 13_1 opens on the right side of the surge tank 12 and corresponds the first cylinder, which is in the left-hand cylinder bank). From the end 13a located inside the surge tank 12, the branch pipe 13_1 extends upward and curves at a prescribed curve angle toward the intake port of the first cylinder (i.e., curves leftward). Meanwhile, the branch pipe 13_2 provided adjacent to the branch pipe 13_1 in a top plan view is arranged such that one end is located inside the surge tank 12 and opens downwardly on the opposite side of the surge tank 12 from the side on which the corresponding cylinder is located (i.e., the pipe 13_2 opens on the left side of the surge tank 12 and corresponds the second cylinder, which is in the right-hand cylinder bank). From the end located inside the surge tank 12, the branch pipe 13_2 extends upward and curves at a prescribed curve angle toward the intake port of the second cylinder (i.e., curves rightward).

The branch pipes 13_3, 13_5, and 13_7 (not shown in FIG. 4) corresponding to the third, fifth, and seventh cylinders (which are in the same bank as the first cylinder), respectively, are arranged and configured to have the same shape in a frontal view as the branch pipe 13_1 corresponding to the first cylinder. Similarly, the branch pipes 13_4, 13_6, and 13_8 (not shown in FIG. 4) corresponding to the fourth, sixth, and eighth cylinders (which are in the same bank as the second cylinder), respectively, are arranged and configured to have the same shape in a frontal view as the branch pipe 13_2 corresponding to the second cylinder.

The air intake device 10 in accordance with this embodiment is characterized by the shapes of the left and right intake pipes 11L and 11R in the vicinity of the left opening 12a and the right opening 12b. The shapes of the pipes in the vicinity of the left opening 12a and the right opening 12b determine the direction in which the intake air flows into the surge tank 12 from the intake pipes 11L and 11R. In this embodiment, the left and right intake pipes 11L and 11R are arranged such that the center outlet axis of a portion of the intake pipes 11L and 11R in the vicinity of where the intake pipe connects to an opening of the volume chamber is different from the center outlet axis of the portion of the other one of the intake pipes in the vicinity of where those intake pipes 11L and 11R connect to an opening of the volume chamber. Thus, the shapes of the left and right intake pipes 11L and 11R are set based on the directions of the center outlet axes of the intake pipes.

Alternatively, it is also acceptable to connect the left and right intake pipes 11L and 11R to the surge tank 12 in such a fashion that the flow directions of the intake air from the intake pipes 11L and 11R into the surge tank 12 are not coincident with each other, i.e., such that the flow directions are not aligned along the same straight line.

Figure 5A:
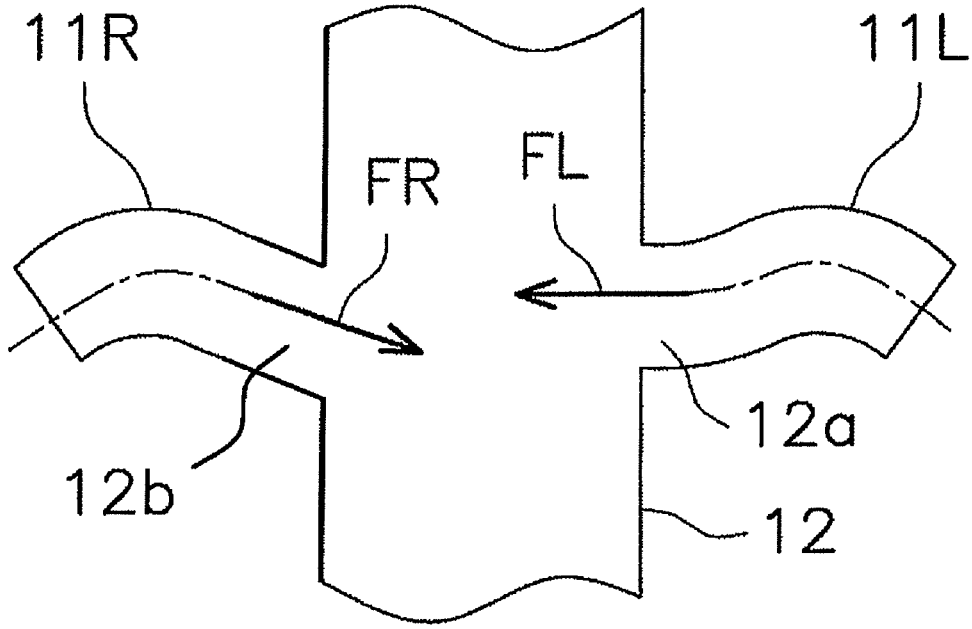
FIG. 5(a) is simplified schematic top plan view illustrating the shapes of the left and right intake pipes in the vicinity of the left and right openings in accordance with the first embodiment illustrated in FIGS. 1 to 4.
Figure 5B:
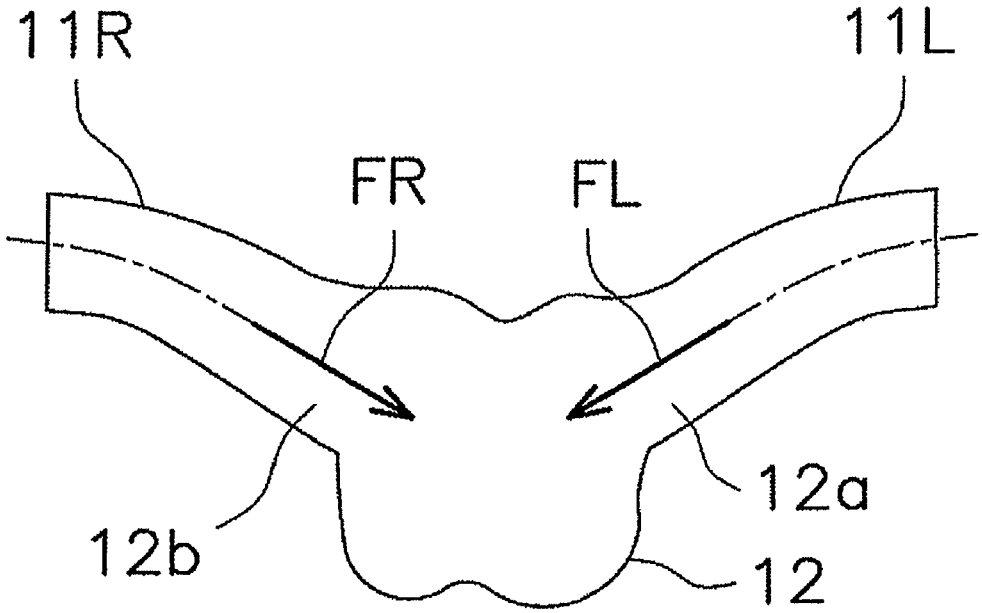
FIG. 5(b) is simplified schematic front elevational view illustrating the shapes of the left and right intake pipes in the vicinity of the left and right openings in accordance with the first embodiment illustrated in FIGS. 1 to 4.

FIGS. 5(a) and 5(b) provide schematic views of the shapes of the left and right intake pipes 11L and 11R in the vicinity of the left and right openings 12a and 12b. FIG. 5(a) is a top plan view and FIG. 5(b) is a front elevational view. FIGS. 5(a) and 5(b) can be thought of as partial cross sectional schematic views showing the left intake pipe 11L, the right intake pipe 11R and the surge tank 12.

As shown in FIG. 5(a), in a top plan view, the tangential direction of the center outlet axis of the left intake pipe 11L points in a rightward direction in the vicinity of the left opening 12a. Thus, the direction of the air flow FL from the left intake pipe 11L into the surge tank 12 is the rightward direction (i.e., generally parallel with respect to the lateral vehicle direction). Meanwhile, in a top plan view, the tangential direction of the center outlet axis of the right intake pipe 11R in the vicinity of the right opening 12b points in a generally leftward direction that is offset toward the front of the vehicle by a prescribed angle with respect to the lateral vehicle direction. Thus, the direction of the air flow FR from the right intake pipe 11R into the surge tank 12 is a direction that is offset toward the front by a prescribed angle with respect to the lateral vehicle direction.

As shown in FIG. 5(b), in a frontal view, the tangential directions of the center outlet axes of the left and right intake pipes 11L and 11R are both generally downward in the vicinity of the left and right openings 12a and 12b. Thus, the directions of the air flows FL and FR from the left and right intake pipes 11L and 11R into the surge tank 12 are both generally downward. Since the flow directions of the left and right air flows FL and FR into the surge tank 12 are different from each other in three dimensions, interference between the left and right air flows FL and FR is minimized and the intake resistance is reduced. That is, the center outlet axis of a portion of any one of the intake pipes in the vicinity of where that intake pipe connects to an opening of the volume chamber is different from the center outlet axes of the portions of all other of the intake pipes in the vicinity of where those intake pipes connect to an opening of the volume chamber. As a result, interference between the left and right air flows FL and FR is minimized and the intake resistance is reduced.

Operation of the Intake Device 10

Figure 6:
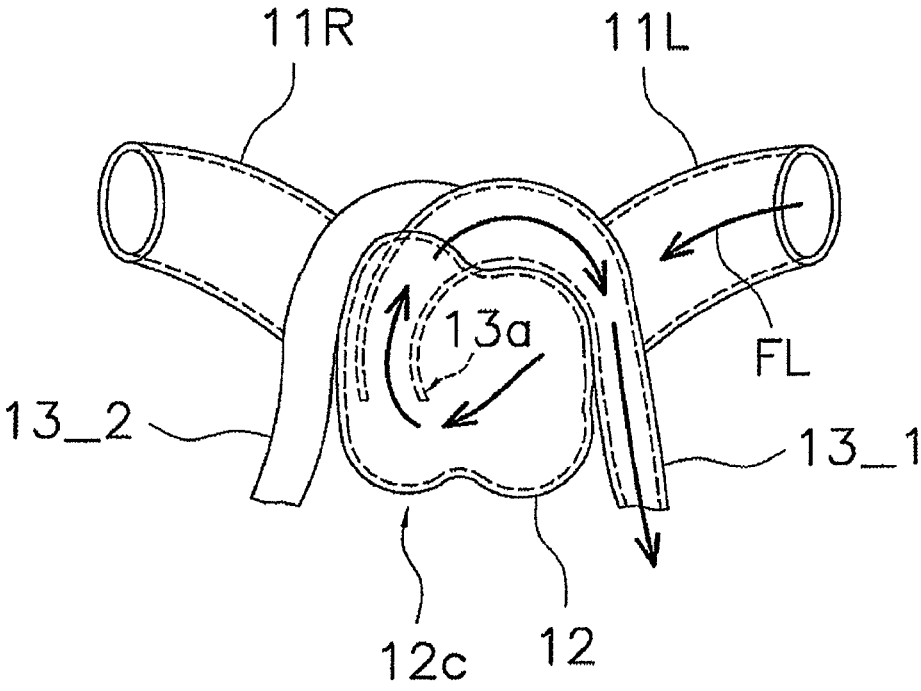
FIG. 6 is a simplified schematic front elevational view illustrating the operation of an intake device in accordance with the first embodiment illustrated in FIGS. 1 to 5(b)

The operation of an intake device 10 in accordance with this embodiment will now be explained with reference to FIG. 6. FIG. 6 is a frontal view of the air intake device 10 that is basically the same as FIG. 4, except that it indicates the flow directions of the intake air with arrows.

The V8 engine in which this intake device 10 is installed has two air induction passage arrangements, a left arrangement and a right arrangement. The intake air drawn into a left throttle body flows downstream through the left intake pipe 11L. Similarly, the intake air drawn into a right throttle body flows downstream through the right intake pipe 11R. Although FIG. 6 only indicates the flow path of the intake air that flows from the left intake pipe 11L, the flow path of the intake air from the right intake pipe 11R is basically the same.

The intake air flowing in the left and right intake pipes 11L and 11R enters the surge tank 12 through the left opening 12a and the right opening 12b, respectively. There is substantially no interference between the left and right air flows FL and FR inside the surge tank 12 because the center outlet axes of the left and right intake pipes 11L and 11R in the vicinity of the left and right openings 12a and 12b, respectively, are arranged such that the flow directions of the left and right air flows FL and FR flowing into the surge tank 12 are not coincident. As a result, the intake air can be delivered to the surge tank 12 with a very low intake resistance. After it is delivered to the surge tank 12, the intake air is distributed to the branch pipes 13_1 to 13_8 from the downwardly opening ends of the branch pipes 13_1 to 13_8, which are arranged inside the surge tank 12.

FIG. 6 illustrates the manner in which intake air inside the surge tank 12 flows into the branch pipe 13_1. As explained previously, the air flow FL from the left intake pipe 11L is directed generally downward. Thus, as shown in FIG. 6, the air entering the surge tank 12 from the left intake pipe 11L flows toward the right-hand recessed section of the bottom inside surface 12c of the surge tank 12 and the recessed section causes the air to flow smoothly into the open end 13a of the branch pipe 13_1. The intake air introduced into the branch pipe 13_1 heads toward the intake port (not shown) of the first cylinder. The intake air introduced into the other branch pipes 13_2 to 13_8 is also guided to the corresponding cylinders with a low intake resistance.

Alternate Embodiments

Figure 7:
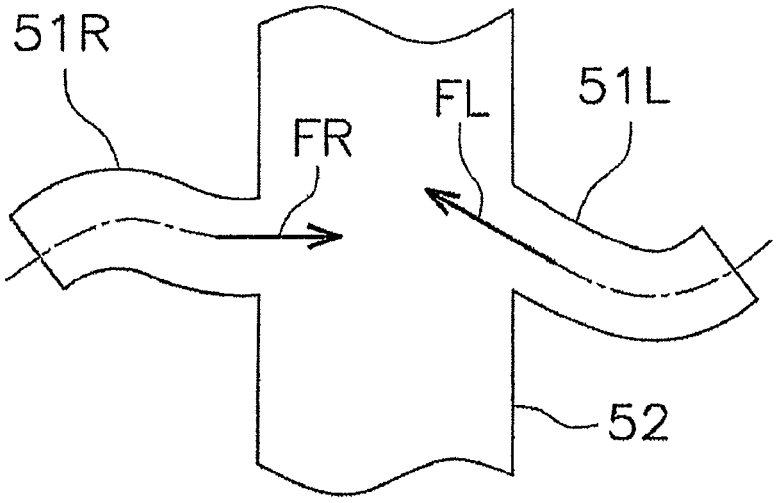
FIG. 7 is a simplified schematic top plan view illustrating an intake device in accordance with an alternative embodiment.
Figure 8A:
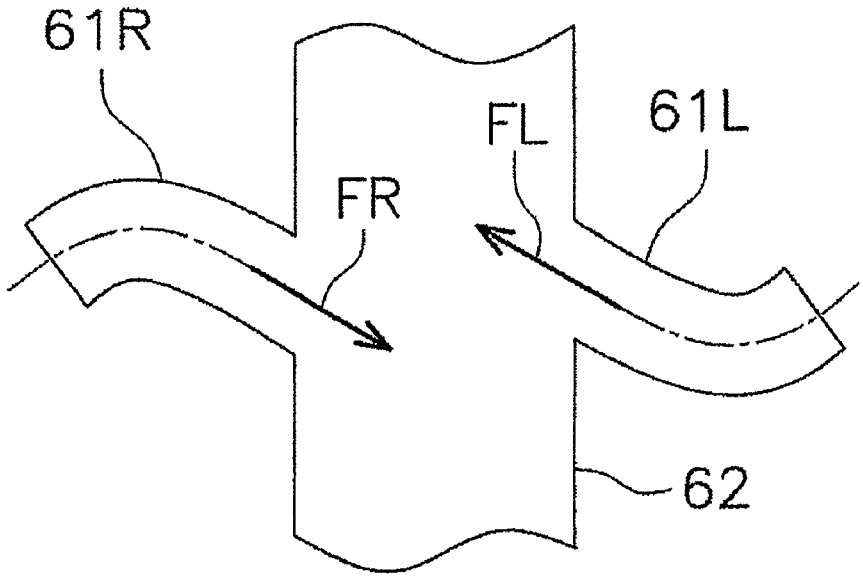
FIG. 8(a) is a simplified schematic top plan view illustrating an intake device in accordance with an alternative embodiment.
Figure 8B:
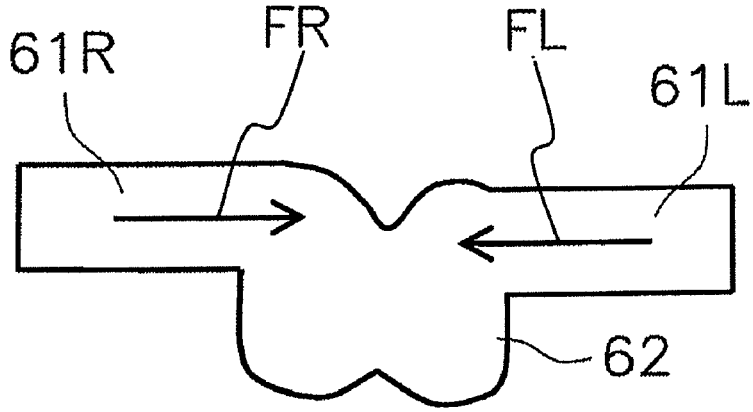
FIG. 8(b) is a simplified schematic front elevational view illustrating an intake device in accordance with the alternative embodiment illustrated in FIG. 8(a)

Referring now to FIGS. 7, 8(a) and 8(b), intake devices in accordance with alternate embodiments will now be explained. In view of the similarity between the first embodiment and these alternate embodiments, the descriptions of the parts of the alternate embodiments that are identical to the parts of the first embodiment may be omitted for the sake of brevity.

In the intake devices in accordance with these alternate embodiments, the center outlet axes of the left and right intake pipes 11L and 11R are arranged such that the flow directions of the intake air flowing into the surge tank 12 from the left and right intake pipes 11L and 11R are not coincident. In other words, the flow directions of the left and right air flows are not limited to those of the example shown in FIGS. 5(a) and 5(b).

FIG. 7 illustrates an alternative example of the flow directions of the left and right air flows using the same format as FIG. 5(a). In the example shown in FIG. 7, in a top plan view, the tangential direction of the center outlet axis of the left intake pipe 51L in the vicinity of the left opening points in a generally rightward direction that is offset toward the rear of the vehicle by a prescribed angle with respect to the lateral vehicle direction. Thus, the direction of the air flow FL from the left intake pipe 51L into the surge tank 52 is a direction that is offset toward the rear by a prescribed angle with respect to the lateral vehicle direction. Meanwhile, in a top plan view, the tangential direction of the center outlet axis of the right intake pipe 51R points in a leftward direction in the vicinity of the right opening. Thus, the direction of the air flow FR from the right intake pipe 51R into the surge tank 52 is the leftward direction (i.e., generally parallel with respect to the lateral vehicle direction).

In the example shown in FIG. 8(a), in a top plan view, the tangential direction of the center outlet axis of the left intake pipe 61L in the vicinity of the left opening points in a generally rightward direction that is offset toward the rear of the vehicle by a prescribed angle with respect to the lateral vehicle direction. Also in the example shown in FIG. 8(b), in a front elevational view, the tangential direction of the center outlet axis of the left and right intake pipes 61L and 61R in the vicinity of the left opening points are vertically offset. Thus, the direction of the air flow FL from the left intake pipe 61L into the surge tank 62 is a direction that is offset toward the rear by a prescribed angle with respect to the lateral vehicle direction. Meanwhile, in a top plan view, the tangential direction of the center outlet axis of the right intake pipe 61R in the vicinity of the right opening points in a generally leftward direction that is offset toward the front of the vehicle by a prescribed angle with respect to the lateral vehicle direction. Thus, the direction of the air flow FR from the right intake pipe 61R into the surge tank 62 is a direction that is offset toward the front by a prescribed angle with respect to the lateral vehicle direction.

With either of the examples shown in FIGS. 7 and 8(a), similarly to the embodiment shown in FIG. 5, interference between the left and right intake air flows inside the surge tank 52 or 62 is minimized because the flow directions of the left and right air flows are not coincident.

The intake resistance can be reduced to the smallest value (i.e., reduced by the greatest degree) by configuring (shaping) the left and right intake pipes such that, in a top plan view, the flow directions of the intake air flowing into the surge tank 62 from the left and right intake pipes 61L and 61R are in opposite directions and not along the same line, as shown in FIG. 8(a). In this embodiment, the left and right intake pipes 61L and 61R are arranged such that in a front elevational view of a vertical plane containing both openings, the center outlet axes thereof lie on substantially parallel lines having different heights in the vertical direction as shown in FIG. 8(b).

When the left and right intake pipes 61L and 61R are configured in this manner, the left and right air flows do not intersect in a top plan view, as shown in FIG. 8(a). This arrangement is useful when the layout of peripheral components in the engine compartment or the capacity of the surge tank prohibits arranging the intake pipes such that the left and right air flows are directed downward in a front elevational view. By arranging the left and right openings of the surge tank 62 such that they are offset from each other in the longitudinal direction, the amount of interference between the left and right air flows can be reduced even further.

Figure 9:
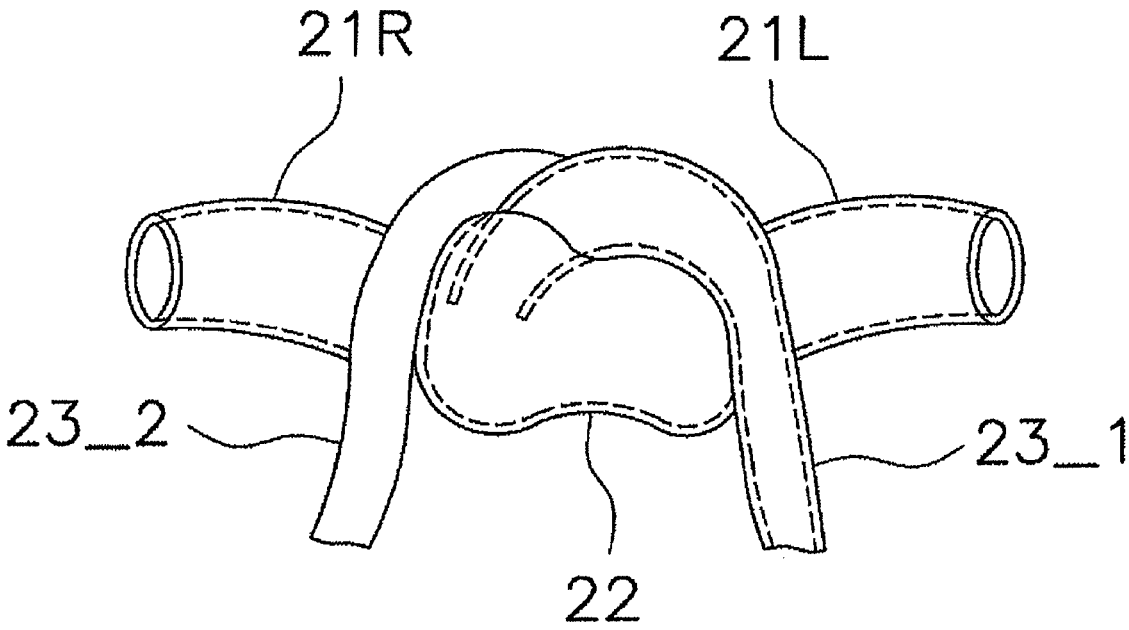
FIG. 9 is a simplified front elevational view of the air intake device in accordance with another alternative embodiment.

FIG. 9 is a front elevational view of an intake device in which the center outlet axes of the left and right intake pipes 21L and 21R are substantially horizontal. In the air intake device shown in FIG. 9, the center outlet axes of the left and right intake pipes 21L and 21R are substantially horizontal and the depth of the surge tank 22 is shallower than the previously described surge tank 12. The intake air inside the surge tank 22 is guided into the branch pipes 23_1 and 23_2. With the air intake device shown in FIG. 9, in order to prevent the left and right air flows flowing into the surge tank 22 from interfering with each other, the left and right intake pipes 21L and 21R need to be configured such that the left and right air flows do not intersect in a top plan view. Therefore, the left and right intake pipes 21L and 21R should be shaped in the manner of the example shown in FIG. 8(a).

It is also possible to determine the flow directions of the intake air flows flowing into the surge tank from the left intake pipe and the right intake pipe based on the firing orders of the cylinders. For example, assume that in the previously described embodiment the firing order is as follows: first cylinder (#1), eighth cylinder (#8), seventh cylinder (#7), third cylinder (#3), sixth cylinder (#6), fifth cylinder (#5), fourth cylinder (#4), and second cylinder (#2). As shown in FIG. 3, the second cylinder (#2) and the fourth cylinder (#4) are in the same cylinder bank and the open ends of the corresponding branch pipes 13_2 and 13_4 are adjacent to each other inside the surge tank 12.

In such a case, since the intake air is drawn into the intake port of the second cylinder (#2) immediately after it is drawn into the fourth cylinder (#4), there is a possibility that the amount of air drawn into the second cylinder will be smaller than the amount of air drawn into the fourth cylinder. Therefore, when the firing orders of two adjacent cylinders of either one of the left and right cylinder banks are successive, it is preferred to arrange and configure the intake pipes such that the flows of intake air flowing into the surge tank 12 from the left and right intake pipes 111 and 11R are directed toward the open ends of the branch pipes corresponding to the two adjacent cylinders whose firing orders are successive. Thus, in the example just described, the center outlet axis of the portion of the right intake pipe 11R in the vicinity of the right opening 12b is set such that the flow of intake air from the right intake pipe 11R is directed toward the open ends of the branch pipes 13_2 and 13_4. As a result, a sufficient quantity of air can be secured in the vicinity of the open ends of the branch pipes 13_2 and 13_4 inside the surge tank 12 so as to accommodate the successive intake strokes of the fourth cylinder (#4) and the second cylinder (#2).

As explained previously, this intake device is arranged in a substantially middle position between the left and right cylinder banks of a V-type internal combustion engine. The air intake device comprises the surge tank 12 (volume chamber), the plurality of branch pipes 13_1 to 13_8 (intake manifold 13), the left intake pipe 11L, and the right intake pipe 11R. The surge tank 12 has the right opening 12a and the left opening 12b provided in the left and right side faces thereof. Each of the branch pipes 13_1 to 13_8 corresponds to one of the cylinders of the V-type engine and one end 13a thereof opens downwardly inside the surge tank 12. Each of the branch pipe 13_1 to 13_8 curves at a prescribed angle from the open end 13a toward the bank containing the corresponding cylinder and is arranged to supply intake air to the corresponding cylinder. The left air intake pipe 11L is connected at one end to the left opening 12a of the surge tank 12 such that intake air drawn from the other end (which is connected to a throttle body upstream) is supplied to the surge tank 12. Likewise, the right air intake pipe 11R is connected at one end to the right opening 12b of the surge tank 12 such that intake air drawn from the other end (which is connected to a throttle body upstream) is supplied to the surge tank 12. The center outlet axes of the left and right intake pipes 11L and 11R in the vicinity of the left opening 12a and the right opening 12b, respectively, are arranged such that the flow directions of the intake air entering the surge tank 12 from the left and right intake pipes 11L and 11R are not coincident.

Therefore, with this intake device, the flows of intake air entering the surge tank 12 from the left and right do not interfere with each other and the intake resistance is lower than a case in which the flows of intake air do interfere. As a result, the amount of intake air distributed to each of the cylinders increases. Thus, the output of the V-type engine is increased compared to when an intake device in which interference of the intake air occurs is used.

In this intake device, the open end of each of the branch pipes (e.g., the end 13a of the branch pipe 13_1) is positioned lower than the left opening 12a and the right opening 12b and the flow directions the intake air into the surge tank 12 from the left and right intake pipes 11L and 11R are oriented downward from a horizontal axis. Thus, a prescribed volume can be secured in the surge tank 12 below the left and right openings 12a and 12b while also reducing the intake resistance.

In this intake device, it is preferable for the flow directions of the intake air flowing into the surge tank from the left intake pipe and the right intake pipe to be opposite each other with a lateral (left to right) axis in-between a plan view. Such an arrangement enables the left and right air flows not to intersect in the top plan view and increases the degree of design freedom with respect to the left intake pipe, the right intake pipe, and the surge tank.

When the firing orders of two adjacent cylinders of either one of the left and right cylinder banks are successive, it is preferred to arrange the center outlet axes of the left and right intake pipes in the vicinity of the left and right openings, respectively, of the surge tank 12 in such a fashion that the flows of intake air flowing into the surge tank 12 from the left and right intake pipes are directed toward the open ends of the branch pipes corresponding to the two adjacent cylinders whose firing orders are successive.

With such an arrangement, a sufficient quantity of air can be secured in the vicinity of the open ends of the adjacent branch pipes corresponding to the adjacent cylinders whose firing orders are successive, thereby accommodating the successive intake strokes of the adjacent cylinders.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and lateral" as well as any other similar directional terms refer to those directions of a vehicle equipped with the present invention. Accordingly, these terms, as utilized to describe the present invention should be interpreted relative to a vehicle equipped with an engine in accordance with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A V-type engine air intake device comprising:

a volume chamber arranged between a first side cylinder bank and a second side cylinder bank, the volume chamber having a first intake opening located adjacent the first side cylinder bank and a second intake opening located adjacent the second side cylinder bank;

a first intake pipe having a first outlet end connected to the first intake opening of the volume chamber and a first inlet end arranged to supply intake air drawn into the first intake pipe to the volume chamber *as a first airflow*, the first outlet end being arranged with a first center outlet axis where that the first intake pipe connects to the first intake opening of the volume chamber;

a second intake pipe having a second outlet end connected to the second intake opening of the volume chamber and a second inlet end arranged to supply intake air drawn into the second intake pipe to the volume chamber *as a second airflow*, the second outlet end being arranged with a second center outlet axis where that the second intake pipe connects to the second intake opening of the volume chamber, with the second center outlet axis being non-coincident with the first center outlet axis *such that substantially no interference occurs between the first and second airflows entering the volume chamber*; and a plurality of curved branch pipes each having an inlet end that opens inside the volume chamber in a substantially vertical downward direction and an outlet end opening for supplying intake air to a corresponding cylinder of the first and second cylinder banks.

2. The V-type engine air intake device as recited in claim 1, wherein the inlet ends of each of the branch pipes has an end face arranged inside the volume chamber that is positioned vertically below the first and second intake openings of the volume chamber; and the first and second center outlet axes of the first and second intake pipes are oriented downward relative to a direction of a horizontal plane.

3. The V-type engine air intake device as recited in claim 1, wherein the first and second intake pipes are arranged such that in a front elevational view, the first and second center outlet axes of the first and second intake pipes are substantially parallel and positioned at different heights in a vertical direction.

4. The V-type engine air intake device as recited in claim 1, wherein the first and second intake pipes are arranged such that in a top plan view, the first and second center outlet axes of the first and second intake pipes are substantially parallel and offset in a horizontal direction.

5. The V-type engine air intake device as recited in claim 1, wherein the first and second intake pipes are arranged such that in a top plan view, one of the first and second center outlet axes of the first and second intake pipes is angled in a rearward direction with respect to a lateral vehicle direction and the other one of the first and second center outlet axes of the first and second intake pipes is angled in a forward direction with respect to the lateral vehicle direction.

6. The V-type engine air intake device as recited in claim 1, wherein the first and second intake pipes are arranged such that in a top plan view, one of the first and second center outlet axes of the first and second intake pipes is angled in a rearward direction with respect to a lateral vehicle direction and the other one of the first and second center outlet axes of the first and second intake pipes is perpendicularly arranged with respect to the lateral vehicle direction.

7. The V-type engine air intake device as recited in claim 1, wherein the inlet ends of two of the branch pipes that are adjacent to one another on one of the first and second side cylinder banks are located inside the volume chamber; and the first and second center outlet axes of the first and second intake pipes are oriented toward the inlet ends of the two of the branch pipes, respectively, that supply intake air to a pair of adjacent cylinders whose firing orders are successive.

8. An internal combustion engine equipped with the V-type engine air intake device as recited in claim 1, wherein the air intake device is mounted to the first and second side cylinder banks.

9. A V-type engine air intake device comprising:

a volume chamber arranged between a first side cylinder bank and a second side cylinder bank, the volume chamber having a first intake opening located adjacent the first side cylinder bank and a second intake opening located adjacent the second side cylinder bank;

a first intake pipe having a first outlet end connected to the first intake opening of the volume chamber and a first inlet end arranged to supply intake air drawn into the first intake pipe to the volume chamber *as a first airflow*;

a second intake pipe having a second outlet end connected to the second intake opening of the volume chamber and a second inlet end arranged to supply intake air drawn into the second intake pipe to the volume chamber *as a second airflow*; and a plurality of curved branch pipes each having an inlet end that opens inside the volume chamber in a substantially vertical downward direction and an outlet end opening for supplying intake air to a corresponding cylinder of the first and second cylinder banks, the first and second intake pipes being connected to the volume chamber such that flow directions of intake air inside the first and second outlet ends of the first and second intake pipes are not aligned along a single straight line *and such that substantially no interference occurs between the first and second airflows entering the volume chamber*.

10. The V-type engine air intake device as recited in claim 9, wherein the inlet ends of each of the branch pipes has an end face arranged inside the volume chamber that is positioned vertically below the first and second intake openings of the volume chamber; and the flow directions of the intake air flowing to the volume chamber in the vicinity of the openings of the volume chamber are oriented downward relative to a direction of a horizontal plane.

11. The V-type engine air intake device as recited in claim 9, wherein the first and second intake pipes are arranged such that the flow directions of the intake air flowing into the volume chamber from the first and second outlet ends of the first and second intake pipes are substantially parallel and positioned at different heights in a vertical direction in a front elevational view.

12. The V-type engine air intake device as recited in claim 9, wherein the first and second intake pipes are arranged such that the flow directions of the intake air flowing into the volume chamber from the first and second outlet ends of the first and second intake pipes are substantially parallel and in opposite directions.

13. The V-type engine air intake device as recited in claim 9, wherein the first and second intake pipes are arranged such that in a top plan view, one of the flow directions of the intake air flowing into the volume chamber from the first and second outlet ends of the first and second intake pipes is angled in a rearward direction with respect to a lateral vehicle direction and the other one of the flow directions of the intake air flowing into the volume chamber from the first and second outlet ends of the first and second intake pipes is angled in a forward direction with respect to the lateral vehicle direction.

14. The V-type engine air intake device as recited in claim 9, wherein the first and second intake pipes are arranged such that in a top plan view, one of the flow directions of the intake air flowing into the volume chamber from the first and second outlet ends of the first and second intake pipes is angled in a rearward direction with respect to a lateral vehicle direction and the other one of the flow directions of the intake air flowing into the volume chamber from the first and second outlet ends of the first and second intake pipes is perpendicularly arranged with respect to the lateral vehicle direction.

15. The V-type engine air intake device as recited in claim 9, wherein the inlet ends of two of the branch pipes that are adjacent to one another on one of the first and second side cylinder banks are located inside the volume chamber; and the flow directions of the intake air flowing to the volume chamber from the first and second outlet ends of the first and second intake pipes are oriented toward the inlet ends of the two of the branch pipes, respectively, that supply intake air to a pair of adjacent cylinders whose firing orders are successive.

16. An internal combustion engine equipped with the V-type engine air intake device as recited in claim 9, wherein the air intake device is mounted to the first and second side cylinder banks.

17. A V-type engine air intake device comprising:

volume chamber means for receiving intake air and for delivering the intake air to a first side cylinder bank and a second side cylinder bank;

first intake communicating means for communicating the intake air to the volume chamber means along a first flow path *as a first airflow*;

second intake communicating means for communicating the intake air to the volume chamber means *as a second airflow* along a second flow path that is not aligned along a single straight line with the first flow path *such that substantially no interference occurs between the first and second airflows entering the volume chamber*; and means for individually conveying intake air from the volume chamber means to cylinders of the first and second cylinder banks such that the intake air flows upwardly in a substantially vertical direction from the volume chamber means and curves to the cylinders of the first and second cylinder banks.

* * * * *